(12) United States Patent
Sun

(10) Patent No.: US 12,663,620 B2
(45) Date of Patent: Jun. 23, 2026

(54) COMPACT TRI-BAND INFRARED AFOCAL TELESCOPE

(71) Applicant: RAYTHEON COMPANY, Waltham, MA (US)

(72) Inventor: Lan Sun, Allen, TX (US)

(73) Assignee: Raytheon Company, Arlington, VA (US)

( * ) Notice: Subject to any disclaimer, the term of this patent is extended or adjusted under 35 U.S.C. 154(b) by 406 days.

(21) Appl. No.: 18/201,241

(22) Filed: May 24, 2023

(65) Prior Publication Data

US 2024/0393572 A1      Nov. 28, 2024

(51) Int. Cl.
| | |
|---|---|
| *G02B 13/14* | (2006.01) |
| *G02B 23/04* | (2006.01) |
| *G02B 26/08* | (2006.01) |
| *G02B 1/11* | (2015.01) |

(52) U.S. Cl.
CPC ........... *G02B 13/146* (2013.01); *G02B 23/04* (2013.01); *G02B 26/0816* (2013.01); *G02B 1/11* (2013.01)

(58) Field of Classification Search
CPC ..... G02B 23/04; G02B 13/008; G02B 13/146
See application file for complete search history.

(56) References Cited

U.S. PATENT DOCUMENTS

| | | | |
|---|---|---|---|
| 9,678,331 | B1 | 6/2017 | Miller |
| 9,810,888 | B2 | 11/2017 | Spencer et al. |
| 10,330,929 | B2 | 6/2019 | Sitter, Jr. |
| 11,392,805 | B2 | 7/2022 | Sinclair et al. |
| 11,474,363 | B2 | 10/2022 | Jew et al. |
| 2010/0321808 | A1 | 12/2010 | Bentley et al. |
| 2015/0253133 | A1* | 9/2015 | Sisney ...................... F41G 1/32 |
| | | | 356/4.01 |
| 2020/0257111 | A1* | 8/2020 | Sinclair .............. G02B 27/0037 |
| 2022/0382049 | A1 | 12/2022 | Cannon |

* cited by examiner

*Primary Examiner* — Paisley L Wilson

(57) ABSTRACT

An optical system includes an external common entrance pupil, a front multispectral objective lens group configured to receive and direct electromagnetic radiation in the multispectral infrared wavelengths, and a first beamsplitter configured to receive electromagnetic radiation from the front objective lens group. The first beamsplitter further is configured to reflect electromagnetic radiation in the short wave infrared (SWIR) wavelength and the middle wave infrared (MWIR) wavelength and to transmit electromagnetic radiation in the long wave infrared (LWIR) wavelength. The optical system further includes a second beamsplitter configured to receive electromagnetic radiation from the first beamsplitter. The second beamsplitter further is configured to reflect electromagnetic radiation in the SWIR wavelength and to transmit electromagnet radiation in the MWIR wavelength. The optical system further includes a spectral hybrid optics groups configured to direct spectrum beams in the LWIR wavelength band, the MWIR wavelength band and the SWIR wavelength.

19 Claims, 2 Drawing Sheets

COMPACT TRI-BAND INFRARED AFOCAL TELESCOPE

BACKGROUND

Optical systems typically include optics that incorporate one or more reflecting and refracting components. When refractive optical elements are used within optical systems, these components often take the form of lenses with one or two curvature radii crafted within a homogeneous material. Use of refractive optical elements introduces various types of geometric and chromatic aberrations onto an optical pupil or an image plane.

Multi-band refractive optical afocal systems are needed for applications such as infrared search and track (IRST), security surveillance, multifunctional electro-optical infrared systems, and forward looking infrared (FLIR) sensing systems. For example, in some applications it is desirable that the optical system selectively provide two or more fields of view, such as a wide-angle field of view for general searching of a large area, and a narrow-angle field of view for higher-magnification, more specific analysis of a small portion of the scene of interest. Further, imaging sensors may be used in disparate (different) wavelength ranges, such as the short wave infrared (SWIR, 0.9-1.7 microns), middle wave infrared (MWIR, 3-5 microns) and/or long wave infrared (LWIR, 8-12 microns), such that one field of view is used in one wavelength range, and another field of view is used in another wavelength range. For instance, some applications may require a wide-angle field of view in the LWIR range, and a narrow-angle field of view in the SWIR range. However, there are only a finite number of materials that may be used to design such systems, and determining the best combination of materials can be difficult.

Presently, there are common aperture refractive optical telescopes that provide dual-band coverage, including SWIR-MWIR, or SWIR-LWIR, or MWIR-LWIR. One example is provided in U.S. Pat. No. 10,330,929. With dual-band designs, the optical efficiency is influenced by optical absorptions of infrared materials. All-reflective telescopes are available to perform the three-band functionality presently lacking in refractive optical telescopes. However, all-reflective telescope designs are exceedingly large and costly to manufacture. Also, all-reflective telescope designs require complex assembly alignment and metrology. Further, all-reflective telescope designs are also not versatile for altering magnifications for each individual spectral band. Other solutions include non-rotational freeform optical surfaces configured to meet challenge image contrast performance goals, which have been designed for various applications. However, the freeform surfaces are not a suitable solution for associated issues of large volume in the multispectral, multifunction application.

SUMMARY

Aspects of the present disclosure are directed to an optical system comprising an external common entrance pupil, a front multispectral objective lens group configured to receive and direct electromagnetic radiation in the multispectral infrared wavelengths, and a first beamsplitter configured to receive electromagnetic radiation from the front objective lens group. The first beamsplitter further is configured to reflect electromagnetic radiation in the short wave infrared (SWIR) wavelength and the middle wave infrared (MWIR) wavelength and to transmit electromagnetic radiation in the long wave infrared (LWIR) wavelength. The optical system further comprises a second beamsplitter configured to receive electromagnetic radiation from the first beamsplitter. The second beamsplitter further is configured to reflect electromagnetic radiation in the SWIR wavelength and to transmit electromagnet radiation in the MWIR wavelength. The optical assembly further comprises a spectral hybrid optics groups configured to direct spectrum beams in the LWIR wavelength band, the MWIR wavelength band and the SWIR wavelength.

Embodiments of the optical system further may include configuring the front multispectral objective lens group to produce a positive refractive power and includes a first lens, a second lens and a third lens. The first lens may have a non-spherical surface and a spherical surface, with the second lens having spherical surfaces and the third lens has a spherical surface and a non-spherical surface. The first lens may be fabricated from ZnSMS, the second lens may be fabricated from $BaF_2$ and the third lens may be fabricated from IRG-24. The spectral hybrid optics group may include a fourth lens, a fifth lens and a sixth lens. Each of the fourth lens, the fifth lens and the sixth lens may include a positive meniscus lens having a hybrid optical surface. The fourth lens may be fabricated from Ge, the fifth lens may be fabricated from Si and the sixth lens may be fabricated from $CaF_2$. The first beamsplitter may be fabricated from Ge, which may be configured to reflect the SWIR and MWIR spectrum beams and to transmit the LWIR spectrum beam. The first beamsplitter may include a plate beamsplitter with a wedge of 20 arcmin. The second beamsplitter may be fabricated from ZnSMS, which may be configured to reflect the SWIR spectrum beams and to transmit the MWIR spectrum beams. The second beamsplitter may include a plate beamsplitter with a wedge of 21 arcmin. The optical system further may include a first folding mirror provided to reflect the LWIR spectrum beams to a first lens of the spectral hybrid optics group. The optical system further may include a second folding mirror provided to reflect the MWIR spectrum beams to a second lens of the spectral hybrid optics group. The second beamsplitter may be configured to reflect the SWIR spectrum beams to a third lens of the spectral hybrid optics group. The optical system further may include a multispectral window configured to direct electromagnetic radiation from the entrance pupil to the objective lens group. The lenses of the spectral hybrid optics group may include a first lens configured to direct spectrum beams in the LWIR wavelength to a LWIR exit pupil, to direct spectrum beams in the MWIR wavelength to a MWIR exit pupil, and to direct spectrum beams in the SWIR wavelength to a SWIR exit pupil. Each of the first lens, the second lens and the third lens may include a positive meniscus lens having a hybrid optical surface. The first lens may be Ge, the second lens may be fabricated from Si and the third lens may be fabricated from $CaF_2$.

Another aspect of the present disclosure is directed to a method of detecting an image of a scene with an optical system. In one embodiment, the method comprises: directing electromagnetic radiation to a front objective lens group of the optical system; directing the electromagnetic radiation from the front objective lens group to a first beamsplitter configured to reflect electromagnetic radiation in the short wave infrared (SWIR) wavelength and the middle wave infrared (MWIR) wavelength and to transmit electromagnetic radiation in the long wave infrared (LWIR) wavelength; directing the electromagnetic radiation from in the SWIR wavelength and the MWIR wavelength to a second beamsplitter; and directing the electromagnetic radiation in the LWIR wavelength from the first beamsplitter and electromagnetic radiation in the SWIR wavelength and the MWIR wavelength from the second beamsplitter to a spectral hybrid optics group configured to direct spectrum beams in the LWIR wavelength, the MWIR wavelength and the SWIR wavelength.

Embodiments of the method further may include directing spectrum beams in the LWIR wavelength to a LWIR exit pupil through a first lens of the spectral hybrid optics. Directing electromagnetic radiation in the SWIR wavelength and the MWIR wavelength may include directing spectrum beams in the SWIR wavelength to a SWIR exit pupil through a second lens and directing spectrum beams in the MWIR wavelength to a MWIR exit pupil through a third lens.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Embodiments of the present disclosure are directed to a multi- or tri-band (SWIR-MWIR-LWIR) telescope that provides multifunctional electro-optical and infrared (EOIR) systems, with a common aperture architecture to address volume, weight and diffraction-limited performance requirement. In certain embodiments, the optical system is particularly suited for a large field of views operating over a temperature range passively with high optical efficiency.

The aspects disclosed herein in accordance with the present invention, are not limited in their application to the details of construction and the arrangement of components set forth in the following description or illustrated in the accompanying drawings. These aspects are capable of assuming other embodiments and of being practiced or of being carried out in various ways. Examples of specific implementations are provided herein for illustrative purposes only and are not intended to be limiting. In particular, acts, components, elements, and features discussed in connection with any one or more embodiments are not intended to be excluded from a similar role in any other embodiments.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any reference to front or back, left and right, top and bottom, upper and lower, and vertical and horizontal are intended for convenience of description not to limit the present systems and methods or their components to any one positional or spatial orientation.

Figure 1:
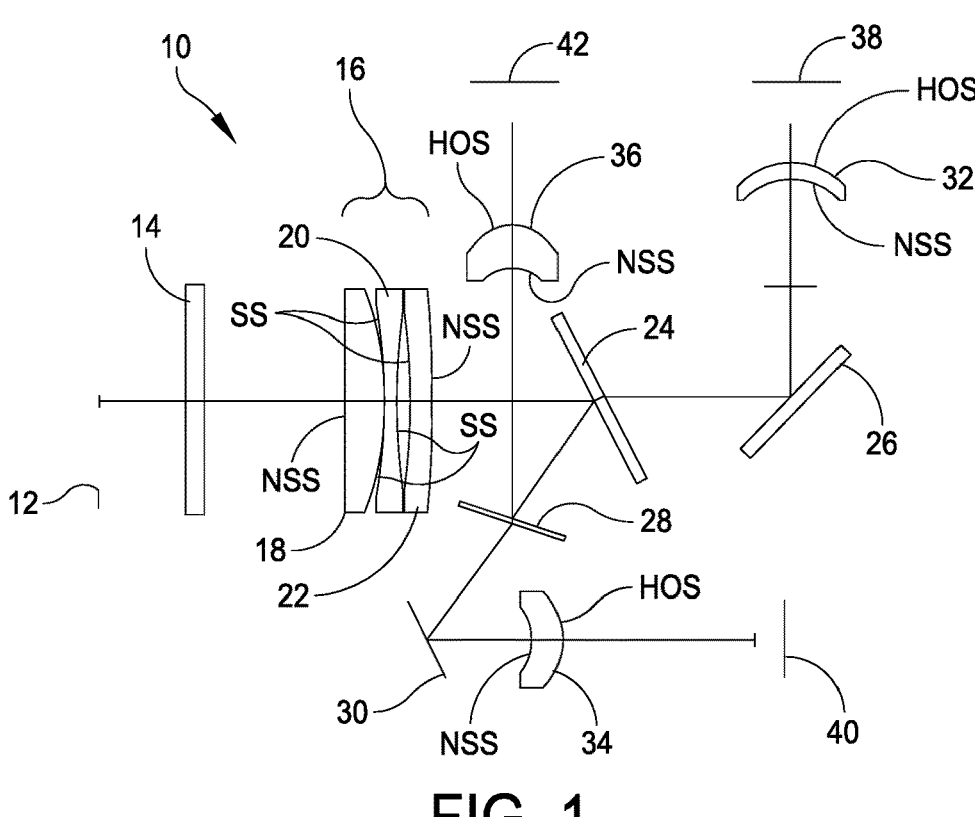
FIG. 1 is a schematic view of an optical system of an embodiment of the present disclosure.
Figure 2:
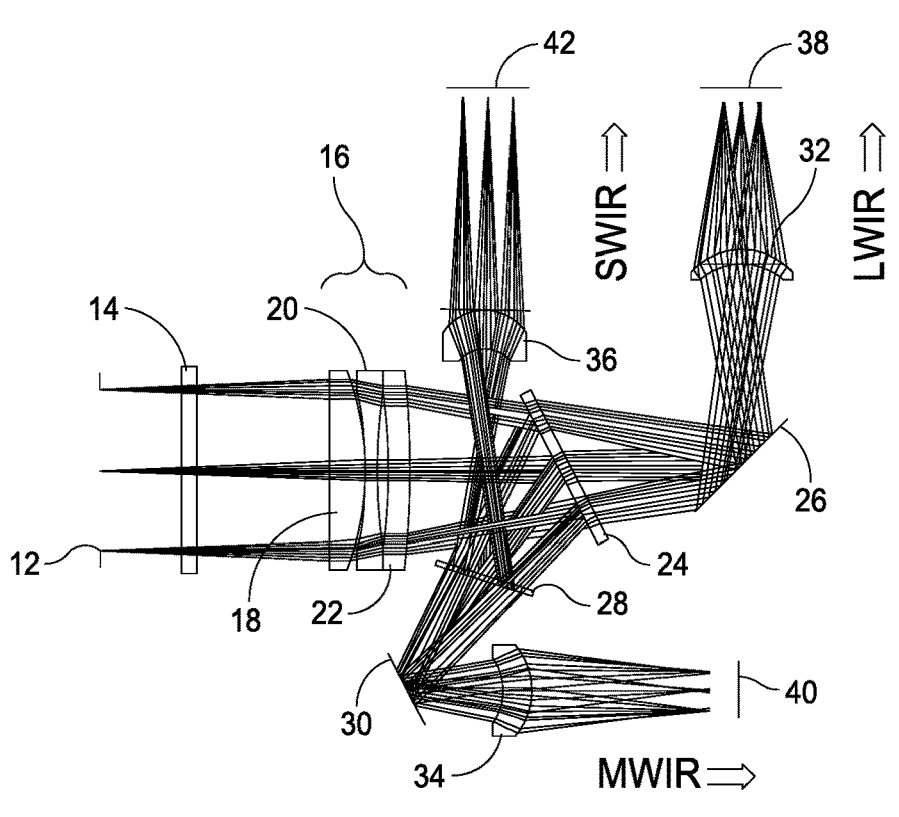
FIG. 2 is a schematic view of the optical system of FIG. 1 showing electromagnetic radiation being directed through the optical system.

Referring to FIGS. 1 and 2, an optical system is generally indicated at 10. As shown, the optical system 10 includes an entrance pupil 12, a multispectral window 14, a front multispectral objective lens group, together indicated at 16, and a spectral hybrid optics group, which will be described in greater detail below. The entrance pupil 12 is defined as the optical image of the physical aperture stop as seen through the front or object side of the optical system 10. The multispectral window 14 directs electromagnetic radiation from the entrance pupil to the objective lens group. The optical system 10 is particularly directed with electromagnetic radiation in the LWIR wavelength, the MWIR wavelength and the SWIR wavelength towards detectors configured to detect the respective images.

In one embodiment, the objective lens group 16 of the optical system 10 provides a positive refractive power and includes three lenses, a first lens 18 embodying a non-spherical surface (NSS) and a spherical surface (SS), a second lens 20 embodying two spherical surfaces (SS), and a third lens 22 embodying a spherical surface (SS) and a non-spherical surface (NSS). In a certain embodiment, the first lens 18 may be fabricated from multispectral Zinc Sulfide (ZnSMS) material. The second lens 20 may be fabricated from Barium Fluoride (BaF$_2$) material. The third lens 22 may fabricated from IRG-24 material. The objective lens group may include more or less than three lenses, with each lens being selected to provide optimal performance.

The optical system 10 further includes a first beamsplitter 24 configured to receive electromagnetic radiation from the objective lens group 16. Once received, the first beamsplitter 24 is configured to reflect SWIR and MWIR spectrum beams to lenses of the spectral hybrid optics group and to transmit LWIR spectrum beams to a lens of the spectral hybrid optics group. As is known, a beamsplitter is an optical device that splits a beam into transmitted and reflected beams. In the shown embodiment, the first beamsplitter 24 may be fabricated from Germanium (Ge) material, which is configured to reflect the SWIR and MWIR spectral beams and to transmit the LWIR spectral beams. In a certain embodiment, the first beamsplitter 24 may embody a plate beamsplitter with a wedge of 20 arcmin.

The optical system 10 further includes a first folding mirror 26 provided to reflect the LWIR spectrum beams to a lens of the spectral hybrid optics group. As is known, a folding mirror is a flat mirror configured to reflect an beam (electromagnetic radiation) to a desired target.

The optical system 10 further includes a second beamsplitter 28, which is configured to reflect and transmit the SWIR and MWIR spectrum beams, respectively, from the first beamsplitter 24. Specifically, the second beamsplitter 28 is configured to reflect SWIR spectrum beams to a lens of the spectral hybrid optics group and to transmit MWIR spectrum beams to another lens of the spectral hybrid optics group. In one embodiment, the second beamsplitter 28 may be fabricated from multispectral Zinc Sulfide (ZnSMS), which is configured to reflect the SWIR spectral beams and to transmit the MWIR spectral beams. In a certain embodiment, the second beamsplitter 28 may embody a plate beamsplitter with a wedge of 21 arcmin.

The optical system 10 further includes a second folding mirror 30, which is provided to reflect the MWIR spectrum beams to a lens of the spectral hybrid optics group. The first folding mirror 26 and the second folding mirror 30 improve the compactness of the optical system 10.

In some embodiments, spectral hybrid optics group includes a fourth lens 32, a fifth lens 34 and a sixth lens 36. Specifically, the fourth lens 32 is configured to direct the LWIR wavelength beam to a LWIR exit pupil 38. The fifth lens 34 is configured to direct the MWIR wavelength beam to a MWIR exit pupil 40. The sixth lens 36 configured to direct the SWIR wavelength beam to a SWIR exit pupil 42. In one embodiment, the LWIR exit pupil 38, the MWIR exit pupil 40 and the SWIR exit pupil 42 are configured to have independent magnifying power in the designated wavelength spectrum. In a certain embodiment, each exit pupil 38, 40, 42 may be an image of the aperture stop of the optical system 10. These images may be captured on a sensor with an array of light sensitive pixels. Although focal plane arrays are used for imaging purposes, the focal plane array can also be used for non-imaging purposes, such as spectrometry, light detection and ranging (LIDAR), and wave-front sensing.

In a certain embodiment, the fourth lens 32 of the spectral hybrid optics group may include a positive meniscus lens having a non-spherical surface (NSS) and a hybrid optical surface (HOS). The fourth lens 32 may be fabricated from Germanium (Ge). Similarly, the fifth lens 34 of the spectral hybrid optics group may include a positive meniscus lens having a non-spherical surface (NSS) and a hybrid optical surface (HOS). The fifth lens 34 may be fabricated from Silicon (Si). And similarly, the sixth lens 36 of the spectral hybrid optics group may include a positive meniscus lens having a non-spherical surface (NSS) and a hybrid optical surface (HOS). The sixth lens 26 may be fabricated from Calcium Fluoride ($CaF_2$). As noted below, the fourth lens 32, the fifth lens 34 and the sixth lens 36 may be selected to provide optimal performance.

In some embodiments, multi-band infrared afocal optical system 10 may be compactly designed, with spherical, non-spherical and Hybrid optical surfaces.

In some embodiments, the optical system 10 achieves apochromatic color corrections from 1.5 micron (mm) to 9.5 micron.

In some embodiments, the entrance pupil 12 of the optical system 10 embodies a common four-inch diameter opening for three (3) wavebands.

In some embodiments, the optical system 10 employs optimized infrared opto-mechanical materials.

In some embodiments, the components of the optical system 10 may be supported by a housing that is specifically designed to support the components of the optical system athermalization, including the objective lens group 16, the spectral hybrid optics lens group, the first beamsplitter 24, the first folding mirror 26, the second beamsplitter 28 and the second folding mirror 30. The housing may be fabricated from a lightweight, high-performance material, such as a PEEK-90CA30 (30% carbon fiber reinforced polyetheretherketone semicrystalline granules). Other suitable materials may also be provided.

In some embodiments, the components of the optical system 10 may be optically passive athermalized with diffraction limited performance from −40° C. to 70° C.

In some embodiments, optical throughput of the optical system 10 is improved for each LWIR/MWIR/SWIR path, including substrate material absorptions and antireflective coatings.

In some embodiments, the spectral hybrid optics group of the optical system 10 include magnifications of 4×(LWIR), 4×(MWIR), and 3.2×(SWIR), while providing large fields of views.

In some embodiments, the optical system 10 achieves a reduced size and weight while achieving increased power. The optical system 10 reduces volume and cost, while improving recognition, deployability and target alignment in operation.

In some embodiments, the each of the first beamsplitter 24 and the second beamsplitter 28 is a wedged beamsplitter that functions as a corrector plate.

In some embodiments, the optical system 10 may include the multispectral objective lens group 16 and the spectral hybrid optics lens group, and additional lenses provided to improve performance.

In some embodiments, a refractive index versus wavelength, for a selection of the infrared optical system 10, are based on published supplier data and/or measurement.

In some embodiments, reflection loss of the high index substrates (such as Ge) and low index substrates (such as $BaF_2$) can cause significant degradation in energy transfer in a system comprised of many refractive optics elements.

In some embodiments, refractive dispersion can be controlled via material refractive index, with diffractive dispersion being an interference effect prescribed by geometry.

In some embodiments, dispersion (n–v) and partial dispersion (p–v) of tri-band glass maps show that frequently used materials with dispersions in an increasing linear fashion while the partial dispersions trend in a decreasing linear fashion. A definition of dispersion $v(1.5\ \mu m{-}10\ \mu m)=(n_{5\ \mu m}{-}1)/(n_{1.5\ \mu m}{-}n_{10\ \mu m})$. A definition of partial dispersion $p(1.5\ \mu m{-}10\ \mu m)=(n_{5\ \mu m}{-}n_{10\ \mu m})/(n_{1.5\ \mu m}{-}n_{10\ \mu m})$.

In some embodiments, $\gamma\upsilon$-$\lambda$ maps for tri-band wavelengths may be developed for instantaneous athermalization and achromatization. Such maps include a thermal glass constant ($\gamma$)=[dn/dT]/(n−1)−CTE, an instantaneous Abbe number ($\upsilon$)=0.5*[n(λ)−1]/[dn/dλ], and an instantaneous dispersion [dn/dλ]=−2/n*$\Sigma_i B_i C_i \lambda/(\lambda^2{-}C_i)^2$, where Bi and Ci are the glass Sellmeier coefficients. In one embodiment, $\lambda_{peak}$ is where the minimum dispersion occurs, when the second derivative of the index is zero.

In some embodiments, hybrid surface optical sag is represented as $z_{sag}=z_{asph\text{-}sag}+z_{phase\text{-}Sag}$. The following equation may be employed:

$$z = \frac{y^2/R}{1+\sqrt{1-(1+k)(y/R)^2}} + \sum_{j=2}^{66} C_j x^m y^n + \tag{1}$$

$$\left[\frac{\sum C_n y^{2n}}{n_1-n_2} - \frac{\lambda_0}{n_1-n_2}\mathrm{INT}\left(\frac{\sum C_n y^{2n}}{\lambda_0}\right)\right]*M$$

$$j = \frac{(m+n)^2+m+3n}{2}+1$$

where,

R=radius of curvature;

k=conic constant;

$C_j$ is the coefficient of the monomial $x^m y^n$;

$C_n$ is the phase coefficient for coefficient number (n);

$n_1$ and $n_2$ are the refractive index before and after the incident ray surface;

$\lambda_0$ is the construction wavelength; and

M is the diffraction order.

Each lens 32, 34, 36 of the spectral hybrid optics lens group, with an aspheric surface and a diffractive surface, works as two independent optical elements. Diffractive optical element introduces negative dispersion which offsets chromatic aberrations induced by other elements in the system. The hybrid surfaces are typically manufactured by diamond turning, addictive manufacturing, and/or electron beam lithography (EBL) to produce the physical structure needed.

In some embodiments, when designing diffractive optical surface for broadband applications, the facet profile shape would be designed to maximize spectrally-averaged diffraction efficiency. A blazed grating's diffraction efficiency as a function of incident angle and wavelength can be predicted using a general efficiency equation, which may be represented as:

$$\varepsilon_m(\lambda) = \left[ \frac{\sin[\pi(B - m)]}{\pi(B - m)} \right]^2 \qquad (2)$$

where, $B = d(n_1 \cos \theta_1 - n_2 \cos \theta_2)/\lambda$;

$\theta_1$ and $\theta_2$ are the angles of the incident ray and the diffracted ray relative to the surface normal;

$n_1$ and $n_2$ are the refractive index before and after the incident ray surface;

m is the diffraction order;

d is the blaze depth; and $\lambda$ is the wavelength.

The phase structure can be represented as function $\phi(x,y)$. Spatial derivative may be determined as $\delta\phi(x,y)/\delta(x,y)=k\delta(x,y)$, where $\delta(x,y)$ is the localized fringe spacing at the location (x,y).

Figure 3:
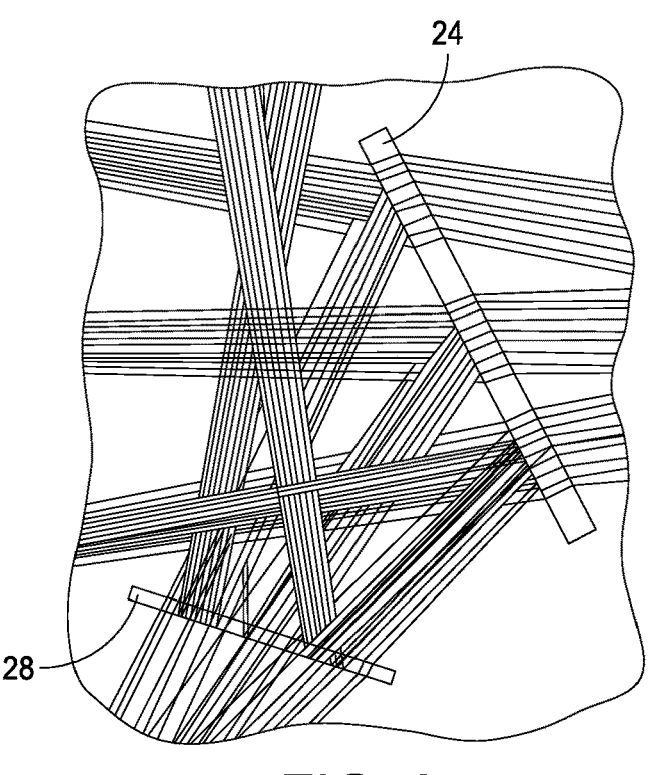
FIG. 3 is an enlarged schematic view showing a portion of the optical system.

With additional reference to FIG. 3, which illustrates a portion of the optical system 10, the folded optical lay of the optical system is shown. The folded configuration achieves a compacted configuration, with the tilted beamsplitters 24, 28 designed with wedge works as correction plates. In one embodiment, the folded layout optical system achieves a volume of 12 inches by 12 inches by 6 inches for an afocal telescope having a 4-inch diameter entrance pupil and a magnification of 4×/4×/3.2×, and an object space field of view of LWIR 5 degrees, MWIR 4 degrees and SWIR 2 degrees.

In summary, the optical path to the LWIR sensor includes electromagnetic waves traveling through lens 18 (ZnSMS), lens 20 (BaF$_2$), lens 22 (IRG-24) and lens 32 (Ge). The optical path to the MWIR sensor includes electromagnetic waves traveling through lens 18 (ZnSMS), lens 20 (BaF$_2$), lens 22 (IRG-24) and lens 34 (Silicon). And finally, the optical path to the SWIR sensor includes electromagnetic waves traveling through lens 18 (ZnSMS), lens 20 (BaF$_2$), lens 22 (IRG-24) and lens 36 (CaF2). The first beamsplitter 24 (Ge) transmits LWIR waves and reflects SWIR waves and MWIR waves. In one embodiment, the first beamsplitter 24 is a plate beamsplitter with a wedge of 20 arcmin. The second beamsplitter 28 (ZnSMS) transmits MWIR waves and reflects SWIR waves at its second surface. In one embodiment, the second beamsplitter 28 is a plate beamsplitter with a wedge of 21 arcmin. The first folding mirror 26 reflects LWIR. The second folding mirror 30 reflects MWIR waves. The result is that lenses 32, 34, 36 operate in tri-band paths, with lens 32 being in LWIR path, lens 34 MWIR path and lens 36 in the SWIR path. The number of glasses, between lenses and beamsplitters, is six, with five aspheric surfaces, three hybrid optical surfaces, and no freeform surfaces.

Figure 4:
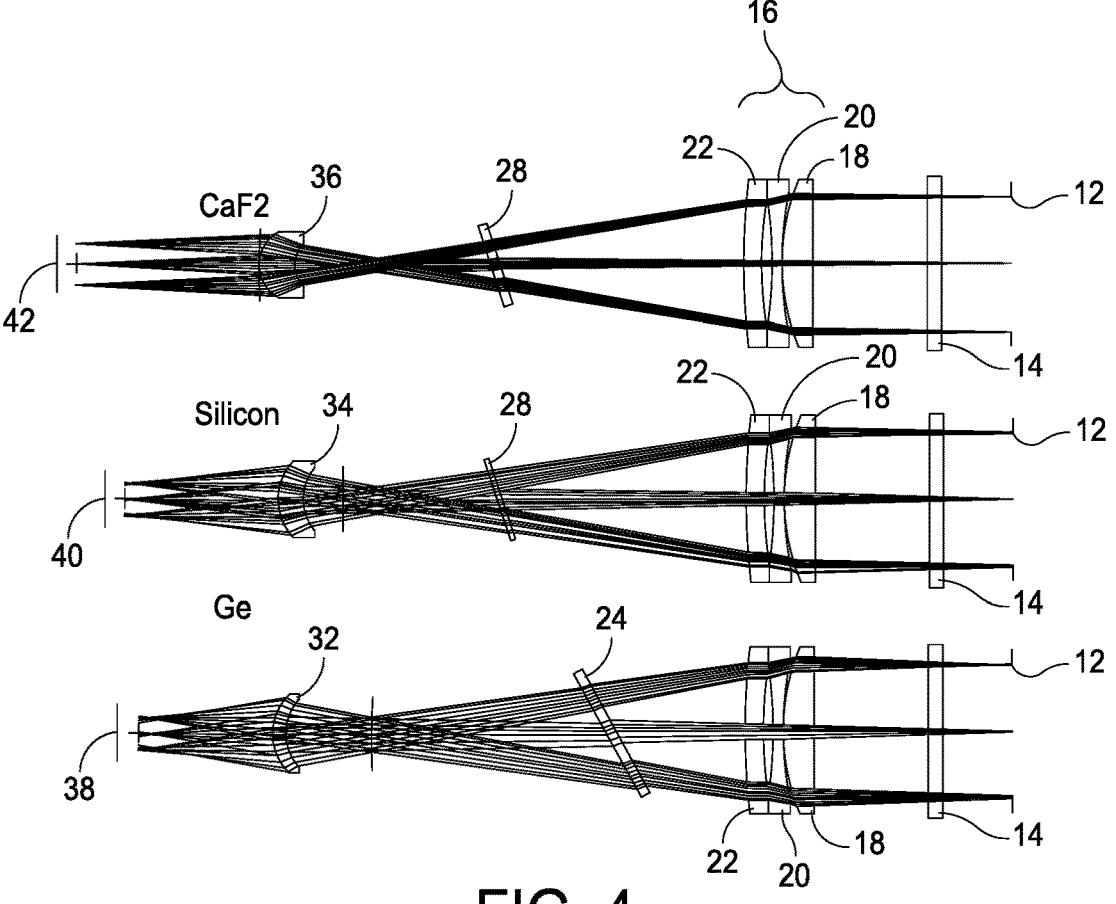
FIG. 4 is a schematic view showing unfolded optical paths of the optical system.

Referring to FIG. 4, the optical layouts or paths of the unfolded optical system 10 is shown. Each of the LWIR path, the MWIR path and the SWIR path are achieved through a common aperture, e.g., entrance pupil 12. In the shown embodiment, the total number of optical surfaces is 18, with 12 curved surfaces (spherical (4), non-spherical (5) and hybrid (3)). In one embodiment, the weight of the optical lenses, excluding the beamsplitters and the folding mirrors is approximately 3 kilograms (kg). In one embodiment, an optical length along an optical axis is less than 12 inches in folded configuration. In one embodiment, a transmission estimate is greater than 86% average to the LWIR sensor, 89% to the MWIR sensor and 90% to the SWIR sensor. Advantages with the disclosed optical system 10 include but are not limited to lower costs on glass material, fabrication and assembly processes. In addition, a compact volume of the optical system is achieved.

In some embodiments, the optical system 10 achieves an on-axis root-mean-square (RMS) wavefront error of <0.054 μm (0.006λ) and an off-axis RMS wavefront error of <0.507 μm (0.059λ) along the LWIR optical path, an on-axis RMS wavefront error of <0.121 μm (0.028λ) and an off-axis RMS wavefront error of <0.189 μm (0.043λ) along the MWIR optical path, and an on-axis RMS wavefront error of <0.009 μm (0.006λ) and an off-axis RMS wavefront error of <0.155 μm (0.10λ) along the SWIR optical path.

In some embodiments, the thermal effects on diffractive optics of the optical system are addressed. A change in refractive index of the substrate does not affect its focal length. Further, a percentage change in focal length due to temperature changes can be approximated as follows:

$\Delta f/\Delta T = f_{DOE} \, 2\alpha$, where a is the substrate expansion coefficient and assuming dn/dT of air is negligible.

Thermal phase coefficients scale factor for $\phi = \Sigma C_n \, r^{2n}$ is calculated as follows:

$C_n' = C_n/(1+\alpha\Delta T)^{2n}$, with $C_1$ scale factors of hybrid optical surface (HOS) of lenses 32, 34, and 36.

Thermal effects on non-spheric coefficients A, B, C, D, E, F is calculated as follows:

Aspheric coefficient scale factor: $1/(1+\alpha\Delta T) \, 2^{n-1}$, with non-spherical surface (NSS) asphere coefficient scale factors of lenses 18, 22, 32, 34 and 36.

In some embodiments, diffractive phase thermal effect is less than ⅛effect than the aspheric thermal effect.

In some embodiments, an inherent low specific gravity of the housing material is 1.3 g/cm$^3$, which is less than half that of aluminum and one sixth that of steel. In a certain embodiment, carbon or glass fibers may be added as structural reinforcements in housing material compounds that have high strength and modulus properties similar to aluminum, but still much lower in density. A superior strength-to-weight ratio so that the housing material compounds may offer equivalent strength and stiffness with up to 70% weight reduction.

Alternative Embodiments

In one some embodiment, an optical system includes a spectral hybrid optics group having rotational symmetric aspheric surfaces. In such an optical system, two beamsplitters, placed similarly as the first and second beamsplitters 24, 28 in optical system 10, are acting as a corrector plate for three separate waveband paths. Namely, a first beamsplitter embodies a wedge beamsplitter having an X-Y polynomial surface in LWIR optical path and a second beamsplitter embodies a wedge beamsplitter having an X-Y polynomial surface in SWIR and MWIR paths.

In another embodiment, an optical system includes a spectral hybrid optics group having a differing rotational symmetric aspheric surfaces. In such an optical system, two beamsplitters, placed similarly as the first and second beamsplitters 24, 28 in optical system 10, are acting as a tilt correction plate for three separate waveband paths. Namely, both a first beamsplitter and a second beamsplitter embody a wedge beamsplitter. The optical system further includes folding mirrors that function as corrector surfaces, with a first folding mirror having an X-Y polynomial surface in LWIR path and a second folding mirror having an X-Y polynomial surface in MWIR path.

In one embodiment, hybrid surface optical sag is represented $z_{sag}=z_{asph\text{-}sag}+z_{phase\text{-}sag}$, which may be represented as:

$$Z_1 = \frac{y^2/R}{1+\sqrt{1-(1+k)(y/R)^2}} + Ay^4 + By^6 + Cy^8 + Dy^{10} + \quad (3)$$
$$Ey^{12} + Fy^{14} + Gy^{16} + \left[\frac{\sum C_n y^{2n}}{n_1-n_2} - \frac{\lambda_0}{n_1-n_2}\text{INT}\left(\frac{\sum C_n y^{2n}}{\lambda_0}\right)\right]*M$$

where,
R=radius of curvature;
k=conic constant;
A, B, C, D, E, F, G . . . are the $4^{th}$, $6^{th}$, $8^{th}$, $10^{th}$, $12^{th}$, $14^{th}$, $16^{th}$ . . . aspheric coefficient;
Cn is the phase coefficient for coefficient number (n);
$n_1$ and $n_2$ are the refractive index before and after the incident ray surface;
$\lambda_0$ is the construction wavelength; and
M is the diffraction order.

Each lens of the spectral hybrid optics lens group, with an aspheric surface and a diffractive aspheric surface, work as two independent optical elements. The diffractive optical element introduces negative dispersion which offsets chromatic aberrations induced by other elements in the system.

The hybrid surfaces of the lenses are typically manufactured by diamond turning, addictive manufacturing and/or electron beam lithography (EBL) to produce the physical structure needed.

In some embodiments, the objective lens group may include lenses having different materials. In one example, the objective lens group includes a lens having ZnSMS, a lens having $BaF_2$ and a lens having IRG-24.

In another example, the objective lens group includes a lens having ZnSMS, a lens having $BaF_2$ and a lens having AMTIR-1.

In another example, the objective lens group includes a lens having ZnSMS, a lens having $BaF_2$ and a lens having AMTIR-2.

In another example, the objective lens group includes a lens having ZnSMS, a lens having $BaF_2$ and a lens having IRG-26.

In another example, the objective lens group includes a lens having ZnSe, a lens having $BaF_2$ and a lens having IRG-26.

And finally, in another example, the objective lens group includes a lens having ZnSe, a lens having $BaF_2$ and a lens having AMTIR-1.

As discussed above, the number of known materials that are transmissive in LWIR, MWIR and SWIR may be limited. Non-limiting examples of such materials include: barium fluoride ($BaF_2$), zinc selenide (ZnSe), multi-spectral zinc sulfide (ZnSMS) (Cleartran™), chalcogenide glasses such as AMTIR-1, AMTIR-2 (AsSe), IRG-24 and IRG-26, gallium arsenide (GaAs), arsenic trisulfide ($As_2S_3$), and cadmium telluride (CdTe).

Once the merit values for each solution are ranked, a designer may use one or more of the solutions to design a multi-band optical system, such as an apochromatic triplet as shown and described herein, which includes first, second, and third lens elements that are each constructed from respective optical materials used to form the solution.

According to a further embodiment, an additional chromatic and/or spatial correction may be performed to an optical design that includes at least one of the solutions. For example, residual aberrations caused by at least one of the design wavelengths (in this particular example, at least one of the first, second, and third design wavelengths) may be corrected by selecting at least one additional lens material that functions as an afocal corrector. In certain instances, at least one additional lens material may include multiple lenses.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. An optical system comprising:
an external common entrance pupil;
a front multispectral objective lens group configured to receive and direct electromagnetic radiation in multispectral infrared wavelengths;
a first beamsplitter configured to receive the electromagnetic radiation from the front multispectral objective lens group, the first beamsplitter further configured to reflect electromagnetic radiation in a short wave infrared (SWIR) wavelength band and a middle wave infrared (MWIR) wavelength band and to transmit electromagnetic radiation in a long wave infrared (LWIR) wavelength band;
a second beamsplitter configured to receive the electromagnetic radiation in the SWIR wavelength band and the MWIR wavelength band from the first beamsplitter, the second beamsplitter further configured to reflect the electromagnetic radiation in the SWIR wavelength band and to transmit the electromagnetic radiation in the MWIR wavelength band; and
a spectral hybrid optics group configured to direct spectrum beams in the LWIR wavelength band, the MWIR wavelength band, and the SWIR wavelength band.

2. The optical system of claim 1, wherein the front multispectral objective lens group is configured to produce a positive refractive power and includes a first lens, a second lens, and a third lens.

3. The optical system of claim 2, wherein the first lens has a non-spherical surface and a spherical surface, the second lens has spherical surfaces, and the third lens has a spherical surface and a non-spherical surface.

4. The optical system of claim 2, wherein the first lens is fabricated from ZnSMS, the second lens is fabricated from $BaF_2$, and the third lens is fabricated from IRG-24.

5. The optical system of claim 2, wherein the spectral hybrid optics group includes a fourth lens, a fifth lens, and a sixth lens.

6. The optical system of claim 5, wherein each of the fourth lens, the fifth lens, and the sixth lens includes a positive meniscus lens having a hybrid optical surface.

7. The optical system of claim 5, wherein the fourth lens is fabricated from Ge, the fifth lens is fabricated from Si, and the sixth lens is fabricated from $CaF_2$.

8. The optical system of claim 1, wherein the first beamsplitter is fabricated from Ge.

9. The optical system of claim 1, wherein the first beamsplitter includes a plate beamsplitter with a wedge of 20 arcmin.

10. The optical system of claim 1, wherein the second beamsplitter is fabricated from ZnSMS.

11. The optical system of claim 1, wherein the second beamsplitter includes a plate beamsplitter with a wedge of 21 arcmin.

12. The optical system of claim 1, further comprising:
a first folding mirror configured to reflect the spectrum beam in the LWIR wavelength band to a first lens of the spectral hybrid optics group.

13. The optical system of claim 12, further comprising:
a second folding mirror configured to reflect the spectrum beam in the MWIR wavelength band to a second lens of the spectral hybrid optics group.

14. The optical system of claim 13, wherein the second beamsplitter is configured to reflect the spectrum beam in the SWIR wavelength band to a third lens of the spectral hybrid optics group.

15. The optical system of claim 1, further comprising:
a multispectral window configured to direct electromagnetic radiation from the external common entrance pupil to the front multispectral objective lens group.

16. The optical system of claim 1, wherein the spectral hybrid optics group includes:
a first lens configured to direct the spectrum beam in the LWIR wavelength band to an LWIR exit pupil;
a second lens configured to direct the spectrum beam in the MWIR wavelength band to an MWIR exit pupil; and
a third lens configured to direct the spectrum beam in the SWIR wavelength band to an SWIR exit pupil.

17. The optical system of claim 16, wherein each of the first lens, the second lens, and the third lens includes a positive meniscus lens having a hybrid optical surface.

18. The optical system of claim 16, wherein the first lens is fabricated from Ge, the second lens is fabricated from Si, and the third lens is fabricated from $CaF_2$.

19. The optical system of claim 1, wherein the optical system when folded achieves a volume of 12 inches by 12 inches by 6 inches for an afocal telescope having a 4-inch diameter entrance pupil and a magnification of 4×/4×/3.2×.

* * * * *